(12) United States Patent
O'Connell et al.

(10) Patent No.: US 6,550,025 B1
(45) Date of Patent: *Apr. 15, 2003

(54) LAST-IN FIRST-OUT DATA STACKS AND PROCESSING DATA USING SUCH DATA STACKS

(75) Inventors: Anne G. O'Connell, Dublin (IE); Mark A. Hughes, Dublin (IE)

(73) Assignee: 3Com Technologies, Georgetown (KY)

( * ) Notice: Subject to any disclaimer, the term of this patent is extended or adjusted under 35 U.S.C. 154(b) by 0 days.

This patent is subject to a terminal disclaimer.

(21) Appl. No.: 09/179,196

(22) Filed: Oct. 27, 1998

(30) Foreign Application Priority Data

Nov. 27, 1997 (GB) .............................. 9724945

(51) Int. Cl.[7] .......................... G01R 31/28; G06F 7/02; H03M 13/00
(52) U.S. Cl. .......................... 714/715; 714/821; 710/52
(58) Field of Search ................. 714/712, 715, 714/821; 710/52, 53, 54

(56) References Cited

U.S. PATENT DOCUMENTS

| | | | |
|---|---|---|---|
| 4,748,438 A | 5/1988 | Mickeal | |
| 5,351,243 A | 9/1994 | Kalkunte et al. | |
| 5,394,394 A | 2/1995 | Crowther et al. | |
| 5,438,528 A | * 8/1995 | Emerson et al. | ............. 702/119 |
| 5,509,006 A | 4/1996 | Wilford et al. | |
| 5,648,965 A | 7/1997 | Thadani et al. | |
| 5,724,558 A | 3/1998 | Svancarek et al. | |
| 5,841,771 A | 11/1998 | Irwin et al. | |
| 5,916,305 A | * 6/1999 | Sikdar et al. | ............... 709/236 |
| 5,991,279 A | 11/1999 | Haugli et al. | |
| 6,021,515 A | 2/2000 | Shimura | |
| 6,230,289 B1 | * 5/2001 | O'Connell et al. | ......... 714/715 |

FOREIGN PATENT DOCUMENTS

| EP | 0142129 A2 | 10/1987 |
|---|---|---|
| EP | 0647082 A2 | 4/1995 |

* cited by examiner

*Primary Examiner*—Albert Decady
*Assistant Examiner*—Joseph D. Torres
(74) *Attorney, Agent, or Firm*—Nixon & Vanderhye PC (57) ABSTRACT

A last-in first-out data stack is able to store a plurality (n) of elements wherein the plurality is greater than two. For each of n storage locations in the stack a selector is adapted to receive n elements read out from the stack and a new element. The selector is arranged to make a controllable selection of its received elements. Combinational logic capable of performing logic manipulations on the selection of elements provides a resultant for pushing onto the stack.

2 Claims, 9 Drawing Sheets

| Instruction | Bits 31:16(opcode in hex) | Bits 15:0 - associated data | |
|---|---|---|---|
| JumpTrue | 0000 | jumpValue (in bytes, but h/w only uses 15:2) | |
| JumpFalse | 0001 | jumpValue (in bytes, but h/w only uses 15:2) | |
| Finish | 0006 or 0007 | reserved | |
| FinishTrue | 0002 | reserved | |
| FinishFalse | 0003 | reserved | |
| LoadOffset | 0010 | dataOffset (in bytes, but h/w only uses bits 12:1) | |
| AddOffset | 0011 | deltaValue (in bytes, but h/w only uses bits 12:1) | |
| PushTrue | 0017 | reserved | |
| PushFalse | 0016 | reserved | |
| or | 0018 | reserved | |
| nor | 0019 | reserved | |
| and | 001A | reserved | |
| nand | 001B | reserved | |
| xor | 001C | reserved | |
| xnor | 001D or 001E or 001F | reserved | |
| TestStatusEqual | 0012 | testValue [7:0] | maskValue [7:0] |
| TestStatusNotEqual | 0013 | testValue [7:0] | maskValue [7:0] |
| TableCmp | 0008 or 0009 | length (in bytes) | |
|  | numCmps | rqPktLeft | |
|  | mask | reserved | |
|  | jumpValue0 (in bytes) | test0 | |
|  | jumpValue1 (in bytes) | test1 | |
|  | jumpValue2 (in bytes) | test2 | |
|  | o | | |
|  | jumpValuen (in bytes) | testn | |
| TestEqualMask<br>TestNotEqualMask | 000A<br>000B | length (in bytes) | |
|  | numCmps | rqPktLeft | |
|  | mask0 | test0 | |
|  | mask1 | test1 | |
|  | mask2 | test2 | |
|  | o | | |
|  | maskn | testn | |
| TestEqual<br>TestNotEqual | 000C<br>000D | length (in bytes) | |
|  | numCmps | rqPktLeft | |
|  | test1 | test0 | |
|  | test3 | test2 | |
|  | o | | |
| TestGreaterThan<br>TestLessOrEqual | reserved | testn | |
|  | 000E<br>000F | length (in bytes) | |
|  | 'h0001' - numCmps | rqPktLeft | |
|  | mask | test | |
| NOP | 0014 | reserved | |
| incCnt | 0004 | cntrNum [15:0] (in bytes, but h/w only uses bits 15:2) | |
| incCntTag | 0005 | cntrNum [15:0] (in bytes, but h/w only uses bits 15:2) | |
| addCntrOffset | 0015 | offset [15:0] (in bytes, but h/w only uses bits 15:2) | |

| Instruction | Opcode | Associated data |
|---|---|---|
| TestStatusEqual | 0012 | test & mask values |
| FinishFalse | 0003 | reserved |
| LoadOffset | 0010 | IpDestAddOffset |
| TestEqual | 000C | length |
| | numCmps | rqPktLeft |
| | 101.70 | 71.161 |
| | 102.70 | 71.161 |
| FinishTrue | 0002 | reserved |
| TestEqual | 000C | length |
| | numCmps | rqPktLeft |
| | 102.70 | 71.161 |
| | 101.70 | 71.161 |
| Finish | 0006 | |

FIG. 9

| Action | Filter Engine Activity | Num Clock Cycles | Total |
|---|---|---|---|
| 1. | As soon as startProgs is asserted, the engine will search through all the bits in the progBitMask field to determine which program to execute. It does this in one clock cycle, and then asserts the request for reading the start address on the next cycle. | 2 | 2 |
| 2. | Engine then reads DRAM to find the start address of the program. | 2 x 10 (other accesses) + 6 (single access) | 26 |
| 3. | The first burst will read in the first 4 longwords of the program and where possible execute them as they are being read in. It will execute the first 3 instructions in this way. | 2 x 10 (other accesses) + 10 (4 lw burst) | 30 |
| 4. | The next burst will be a single read of instruction to figure out the number of compares required for the first testEqual instruction. | 2 x 10 (other accesses) + 6 (single access) | 26 |
| 5. | The next burst will burst 2 longwords of data from the packet. These are the IP destination and source addresses. | 2 x 10 (other accesses) + 7 (2 lw burst) | 27 |
| 6. | The next burst will burst in 2 longwords of test values from the instruction stream. The comparisions occur as the test values are being read in. There is no match | 2 x 10 (other accesses) + 7 (2 lw burst) | 27 |
| 7. | Next burst reads in 4 longword of instruction. The FinishTrue instruction is executed as it is read in. The testEqual instruction must wait for the first time burst to complete. | 2 x 10 (other accesses) + 10 (4 lw burst) | 30 |
| 8. | Data already on chip - time to compare only | 6 clock cycles | 6 |
| 9. | Next single burst reads last longword of test values from instruction stream, and compares them as they are being read in. There is no match. | 2 x 10 (other accesses) + 6 (single access) | 26 |
| 10. | Next burst reads 4 instructions from instruction stream. Engine will execute the Finish instruction on the fly. | 2 x 10 (other accesses) + 10 (4 lw burst) | 30 |
| 11. | Time to scan to end progBitMask, determine there are no more requests and assert progsDone | 2 | 2 |
| | | Total | 232 |

FIG. 10

| Instruction | Opcode | Associated Data |
|---|---|---|
| TestStatusEqual | 0012 | test and mask values |
| FinishFalse | 0003 | reserved |
| LoadOffset | 0010 | 12 (decimal) |
| TestGreaterThan | 000E<br>numCmps(1)<br>0xFFFF | length (12bytes)<br>rqPktLeft<br>0x0800 |
| jmpFalse | 0001 | reserved |
| addCntrOffset | 0015 | ethstatsOffset |
| TblCmp | 0008<br>numCmps<br>0xffff(mask)<br>$eth.ipx<br>$eth.arp<br>$eth.ip<br>...... | length (in bytes)<br>rqPktLeft<br>reserved<br>8137<br>0806<br>0800<br>...... |
| addCntrOffset | 0015 | eth.ipstats (in bytes) |
| loadOffset | 0010 | FragOffField (in bytes) |
| TestEqualMask | 000A<br>numCmps(1)<br>0x1fff | length (12 - in bytes)<br>rqPktLeft<br>0x0000 |
| jmpTrue | 0000 | eth.ip.frag (in bytes) |
| loadOffset | 0010 | ipProtField (in bytes) |
| TblCmp | 0008<br>numCmps<br>0x00ff(mask)<br>$eth.ip.icmp<br>$eth.ip.tcp<br>$eth.ip.igmp<br>...... | length (in bytes)<br>rqPktLeft<br>reserved<br>0x0001<br>0x0006<br>0x0002<br>...... |
| incCntTag | 0005 | igmpOffset |
| finish | 0006 | reserved |

FIG. 11

| Action | Filter Engine Activity | Num Clock Cycles | Total |
|---|---|---|---|
| 1. | As soon as startProgs is asserted. the engine will search through all the bits in the progBitMask field to determine which program to execute. It does this in one clock cycle, and then asserts the request for reading the start address on the next cycle. | 2 | 2 |
| 2. | Engine then reads DRAM to find the start address of the program. | 2 x 10 (other accesses) + 6 (single access) | 26 |
| 3. | The first burst will read in the first 4 longwords of the program and where possible execute them as they are being read in. It will execute the first 3 instructions in this way. | 2 x 10 (other accesses) + 10 (4 lw burst) | 30 |
| 4. | The next burst will be a single read of instruction to figure out the number of compares required for the first testGreaterThan instruction. | 2 x 10 (other accesses) + 6 (single access) | 26 |
| 5. | The next burst will burst 1 word of data from the packet - the type field. | 2 x 10 (other accesses) + 6 (1 lw burst) | 26 |
| 6. | The next burst will burst in 4 longwords of test values from the instruction stream. The comparisons occur as the test values are being read in. Result is true => ethernet packet. | 2 x 10 (other accesses) + 10 (4 lw burst) | 30 |
| 7. | Read in 4 more instructions starting from jmpFalse instruction, and execute jmpFalse and addCntrOffset as instructions being read in. | 2 x 10 (other accesses) + 10 (4 lw burst) | 30 |
| 8. | Single longword instruction read to read mask field of first tableCompare instruction | 2 x 10 (other accesses) + 6 (1 lw burst) | 26 |
| 9. | Read in 4 more instructions to get the test values for tableCompare instruction. Data already on chip from previous read, so start comparing as instructions being read in. Get a match on ip type field. | 2 x 10 (other accesses) + 10 (4 lw burst) | 30 |
| 10. | Read in 4 more instructions starting from addCntrOffset instruction, and execute addCntrOffset and loadOffset as instructions being read in. | 2 x 10 (other accesses) + 10 (4 lw burst) | 30 |
| 11. | Single word read of DRAM to get fragField from data stream, in preparation for testEqualMask instruction. | 2 x 10 (other accesses) + 6 (1 lw burst) | 26 |
| 12. | The next burst will burst in 4 longwords of test values from the instruction stream. The comparisons occur as the test values are being read in. Result is false => not a fragment | 2 x 10 (other accesses) + 10 (4 lw burst) | 30 |
| 13. | Read in 4 more instructions starting from jmpTrue instruction, and execute jmpTrue and loadOffset as instructions being read in. | 2 x 10 (other accesses) + 10 (4 lw burst) | 30 |
| 14. | Single longword instruction read to read mask field of first tableCompare instruction | 2 x 10 (other accesses) + 6 (1 lw burst) | 26 |
| 15. | Single word read of DRAM to get ip Protocol field from data stream, in preparation for tableCompare instruction. | 2 x 10 (other accesses) + 6 (1 lw burst) | 26 |
| 16. | Read in 4 more instructions to get the test values for tableCompare instruction, and compare as instructions being read in. Get a match on igmp type field. | 2 x 10 (other accesses) + 10 (4 lw burst) | 30 |
| 17. | Read in 4 more instructions starting from incCntTag instruction. Wait until burst done before implementing incCntTag. | 2 x 10 (other accesses) + 10 (4 lw burst) | 30 |
| 18. | Read-modify -write access of counter value | 2(2 x 10 (other accesses) + 10 (4 lw burst)) | 52 |
| 19. | Next burst reads 4 instructions from instruction stream. Engine will execute the Finish instruction on the fly. | 2 x 10 (other accesses) + 10 (4 lw burst) | 30 |
| 20. | Time to scan to end of progBitMask, determine there are no more requests and assert progsDone. | 2 | 2 |
| | | Total | 538 |

LAST-IN FIRST-OUT DATA STACKS AND PROCESSING DATA USING SUCH DATA STACKS

CROSS-REFERENCE TO RELATED APPLICATIONS (1) O'Connell et al, entitled 'ANALYSIS OF DATA STREAMS', Ser. No. 09/179,197 filed of even date herewith.

(2) O'Connell et al, entitled 'TESTING DATA PACKETS', Ser. No. 09/179,195 filed of even date herewith.

FIELD OF THE INVENTION

This invention relates to the analysis and testing of data streams, primarily although not exclusively data contained in data packets in a communication network, whereby to develop mainly statistical or control information for use in the management of the network.

A primary usage of the invention would be in a processor which is adapted to receive information from a variety of sources, such as audio sources, telephone, television, local area networks and others, providing streams of information, normally in data packets which may assume a variety of forms, and prepares those packets, by modification of the packets, particularly in relation to header information, for transmission over a common medium, such as a synchronous transfer mode link whereby the data packets are transmitted over a plurality of virtual circuits (defined by the segmenting and switching operation of an asynchronous transfer mode switch) to a variety of receivers wherein the packets are distributed to their ultimate destinations. The processor could but need not be one that performs a bidirectional function acting both as a receiver and ATM transmitter as well as an ATM receiver and distributor of the packets.

BACKGROUND TO THE INVENTION

It is a practical necessity in communication systems generally, and certainly of the type just mentioned, to provide temporary storage of data packets in a fairly high volume random access memory, normally a dynamic random access memory in order to provide rapid reading and retrieval operations. It is known quite widely to organise such a memory into a multiplicity of buffers each capable of containing data corresponding to a substantial number of data packets and to control the reading and writing of data to and from the buffers by means of software conveniently termed pointer tables which indicate the order in which buffers will be read and also indicate which buffers are available.

Organisation of the storage of data in this manner is a practical necessity owing to the large variety of possible sources and rates of communication of data which those sources may provide, the different priorities of data or data channels and so on.

Commonly, for example, data packets received at a processor of this kind need data processing for each packet, for example the examination of the address data (such as MAC address) so that it may be allotted to appropriate communication channels according to whether it is a uni-cast message (intended for a specific destination), a multi-cast message (intended for a specified plurality of destinations) or a broadcast message, and so on.

It is desirable to analyse the control data or destination data in the data packets in order to obtain statistical information which will assist the management of data flow in the network to determine, for example, whether there is an undue proportion of defective data packets. It is also desirable to be able to add offsets to data values to assist in examining different pointers of a data packet for statistical collection purposes. These and other operations may be performed by a data processor but the large volume of data normally handled by a system of this nature makes the consumption of ordinary data processing time undesirable owing partly to the difficulty of providing sufficient processing power and partly to the increased latency that would be produced.

SUMMARY OF THE INVENTION

The present invention is one aspect of an improved technique by means of which buffer data can be analysed more efficiently.

The first of the co-pending applications of previous mention concerns a technique comprising reading buffer data and applying to data packets appearing sequentially in the data a group of instructions which independently test data of the data packets in turn. That is to say, the instruction stream, which may be customised according to preference, is a selection from a larger set of tests or instructions. The advantage of this technique is that it is feasible to perform rapid statistical analysis of a large number of data packets, without full examination or processing of those packets. One may determine, for example, how many packets are being transferred in a given interval from an identified source to an identified location and determine the kind of packet.

Further, one may build a protocol distribution tree. Such network management information is used for the analysis known as RMON1 and RMON2 in the IEEE network standards.

The present invention particularly concerns the management of data stacks in such a technique and more generally.

A method of processing data according to the invention generally comprises providing a program of selected microcode instructions of which at least one prescribes a test on a data pattern in a data packet, subjecting a multiplicity of said data packets to said program including said test, pushing a result of each said test onto a last-in first-out temporary storage stack, performing a combinational logic operation on all the results in said stack, removing all said results from said stack, and pushing the resultant of said logic operation onto said stack. Preferably all said results are removed from said stack in one operation, and said resultant is pushed onto said stack in the same operation.

A last-in first-out data stack according to the invention is able to store a plurality (n) of elements wherein the plurality is greater than two and comprising for each of n storage locations in the stack a selector means adapted to receive n elements read out from the stack and a new element, the selector means being arranged to make a controllable selection of its received elements and combinational logic capable of performing logic manipulations on said selection of elements, and providing a resultant for pushing onto said stack.

BRIEF DESCRIPTION OF THE DRAWINGS

FIGS. 9 to 12 illustrate specific examples of a novel read and comparison technique.

DETAILED DESCRIPTION

Figure 1:
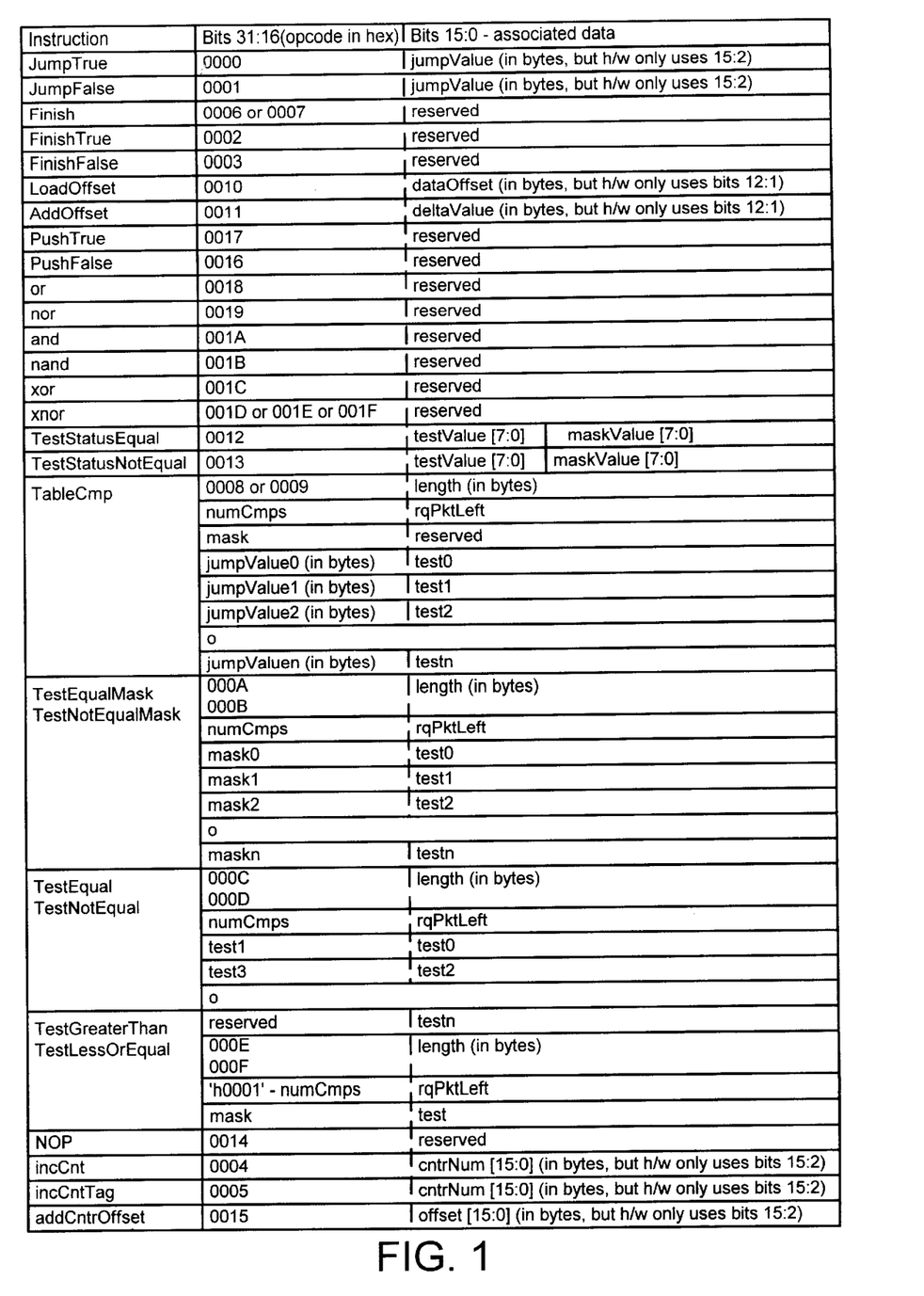
FIG. 1 is a table of microcode instructions which may be used for the hardware processing and testing of data packets.

The table shown in FIG. 1 illustrates a set of microcode instructions which may be employed for hardware processing of data packets. The various instructions are described in detail in the following. Some of them are used in conjunction with counters which record events for RMON statistics. The packets which are analysed would be held in DRAM and therefore a pointer to the start of a packet is passed to the controlling 'engine' along with a list (which is preferably defined by a bit mask) of selected instructions from the set to be executed on the packet. These programs are the microcode instructions. Some of the program returns a single bit pass/fail result, one of the programs can return a tag result field which is up to thirty-two bits wide. The bit mask can define a multiplicity of programs. The bit mask indicates which programs are to be executed. Each program is composed of individual instructions. In this example, up to thirty-one programs can be executed on any packet.

In the example given in FIG. 1 there are twenty-eight instructions defined and supported. Some of these instructions have two or more operation codes (opcodes) assigned to them for ease of decoding. All instructions must begin on a long word (32-bit) aligned boundary. Data can begin on any word (16-bit) or longword (32-bit) boundary. The default length of the instructions is one longword. However, there are a number of instructions which are variable in length. In these cases, the length of the instruction is defined in the instruction itself Some of the instructions generate a single bit result. These results are 'pushed' onto a stack. The stack is (in this example) four entries deep. Pushing more than four entries on the stack results in the oldest entries being lost. At the end of each program, the overall result of that program is available at the top of the stack, and this result is loaded into the result register for that program. Note that the stack is not cleared between programs—the result of the last program is at the top of the stack when a subsequent program begins.

The opcodes of each instruction always occupy bits 31:16 of the longword. The opcode value is defined below in each instruction.

There are a number of pointers associated with the instruction stream and the data stream:
(1) progAddr points to the current instruction in the instruction stream, and as all instructions are longword aligned, this is a longword pointer.
(2) dataAddr points to the data stream. It is a word address, allowing for data to start on a longword or a word aligned boundary. This pointer is reset to sopAddr at the beginning of every program.
(3) sopAddr points to the start of the packet being processed. This is passed to the controlling engine. Hardware uses bits [22:1] of this field, allowing for data to start on a longword or a word aligned boundary.
(4) cntrAddr is the current address pointer of the statistics locations. This is loaded with statsindex at the start of every program, then modified using AddCntrOffset and incCnt instructions to point to the correct stats location. 'statsIndex is passed to the controlling engine as the base address of a block of counters which will be used by the programs and will generate statistical results.

The individual instructions are as follows.

NOP

This instruction does nothing—no operation.

LoadOffset

This instruction loads the dataAddr with the sopAddr added with the value following the opcode. The dataOffset field is in byte quantities, but the hardware ignores bit 0, modifying the dataAddr by word quantities only. The maximum offset supported is ±2 k words.

dataAddr<—sopAddr+dataOffset[12:1].

AddOffset

This instruction adds deltaValue (the value following the opcode) to the current dataAddr. 'deltaValue can be used to move the pointer forwards or backwards by making the value a 2's complement value, and hardware sign extends that value to the correct width. Hardware assumes that the deltaValue has been sign extended up to bit 15 of the dataOffset field. The deltaValue is in byte quantities, but the hardware ignores bit 0, modifying the dataAddr by word quantities only. The maximum offset supported is ±2 k words:

dataAddr<—dataAddr+deltaValue[12:1].

FinishTrue

If the value at the top of the stack is true (=1'b1), then finish the current program, else pop the stack by one position and continue executing next instruction. Note that if the top of the stack is true, then the stack is not popped:

if topStack=1'b1,
      finish current program
      load result into correct position in result register
      if last program
        if writeResults
          write results to resultsAddr
          write tag to resultsAddr+4
        endif
      endif
    else
      pop stack by one position.

FinishFalse

If the value at the top of the stack is false (=1'b0), then finish the currentprogram, else pop the stack by one position and continue executing next instruction. Note that if the top of the stack is false, then the stack is not popped:

if topStack=1'b0
      finish current program
      load result into correct position in result register
      if last program
        if writeResults
          write results to resultsAddr
          write tag to resultsAddr+4
        endif
    else
      pop stack by one position.

Finish

Finish current program and load top of stack into correct position in result register. Note that the stack is not popped, and value at the top remains valid. If its the last program in the pro-BitMask to execute, and if writeResults is asserted, then write the results field to resultsAddr, and the tag field to the next location, finish current program
load result into correct position in result register
if last program
  if writeResults
    write results to resultsAddr
    write tag to resultsAddr+4
  endif
endif JumpTrue If the value at the top of the stack is true (=1'b1), then add the jumpValue to the progAddr to generate a new progAddr; else pop the stack by one position and continue executing next instruction. JumpValue is a byte quantity, but hardware only uses bits 15:2 of the field. The program can jump 'backwards' by making the jump value a 2's complement number, as hardware sign extends that value to the correct width:

if topStack=1'b1,
    progAddr<—progAddr+jumpValue
  else
    pop stack.

JumpFalse

If the value at the top of the stack is false (=1'b0), then add the jumpValue to the progAddr to generate a new progAddr, else pop the stack by one position and continue executing next instruction. JumpValue is a byte quantity, but hardware only uses bits 15:2 of the field. The program can jump 'backwards' by making the jump a 2's complement number, as hardware sign extends that value to the correct width:

if topStack=1'b0,
    progAddr<—progAddr+jumpValue
  else
    pop stack.

PushTrue

Push a value of true onto the stack.

Push False

Push a value of false onto the stack.

or, nor, and, nand, xor, xnor

These six different instructions each pop the top two results off the stack, perform combinational logic on them and push the result onto the stack.

TestStatusEqual, TestStatusNotEqual

Tests status bits of the packet against a test value. The packet status bits, pktStatus, are passed to the filter engine. The instruction contains two values, a mask value, maskValue, and a test value, testValue. The mask value selects which bits of pktStatus to compare against the test value. A '1' in a mask position means compare, a '0' means don't compare.

For TestStatusEqual instruction, if there is a match in these bits, then a value of TRUE (1;b1) is pushed onto the stack. If there is a mismatch in any of these bits, a value of FALSE (1'b0) is pushed onto the stack:

if ((pktStatus XOR testValue) AND maskValue)=all zeros, then
    PushTrue
  else
    PushFalse.

For TestStatusNotEqual instruction, if there is a mismatch in any of the bits being compared, then a value of TRUE (1'b1) is pushed onto the stack. If there is a match in all bits being compared, then a value of FALSE (1'b0) is pushed onto the stack:

if ((pktStatus XOR testValue) AND maskValue)!=all zeroes, then
    PushTrue
  else
    PushFalse.

AddCntrOfffset

Modifies the cntrAddr by adding the offset value to the current value. The offset value is in byte quantities. As the counter addresses are longword quantities, hardware only uses bits 15.2 of the offset field. The cntrAddr can be offset by a negative quantity by making the offset a 2's complement number, as hardware sign extends that value to the correct width:

cntrAddr<—cntrAddr+offset[15:2].

IncCntTag, IncCnt

Perform a read-modify-write operation on the 32-bit counter value at the address specified. The 32-bit counter value must also be longword aligned. The counter address is generated by adding the cntrNum field to the current value of cntrAddr. As in the AddCntrOffset instruction, the cntrNum field is in byte quantities, but hardware only uses bits [15:2] of the field, as it assumes the counter addresses are longword addresses. (Note that if cntrNum is a 2's complement number, the address is offset by a negative amount, as hardware sign extends that value too the correct width.) The IncCntTag instruction also causes a tag value, tag, to be latched. This tag value will be the DRAM address of the counter value:

cntrAddr<—cntrAddr+cntrNum
  increment by one the value @ cntrAddr
  if IncCntTag
    set tag to cntrAddr
  endif.

TestEqualMask, TastNotEqualMask

This instruction does a string comparison between the input data stream and the test value. If there is a match, a value of TRUE is pushed onto the stack. if there is no match, a value of FALSE is pushed onto the stack. A mask field, mask, selects which bits of the data stream to compare. A '1' in a mask position means compare, a '0' means don't compare. The number of words to compare against is defined in the numCmps field. This instruction can be a variable length, The length field in the instruction indicates the length of the current instruction in bytes. This instruction contains an even number of longwords, thereby ensuring that the next instruction starts on a long word boundary. The required length of the packet remaining after the current data pointer, rqPktLeft, is compared against the current length of the packet after the data pointer, pktLeft. PktLeft is calculated in the filter engine as pktLen —(dataAddrsopAddr); pktLen and sopAddr being passed to the engine. If rqPktLeft is greater than the remaining pktLeft, the test fails and processing continues at the next instruction. Both rqPktLeft and pktLeft are defined as byte lengths:

if pktLeft<rqPktLeft
    push a value of FALSE onto the stack
  else
    while numCmps>0
      if ((test(n) XOR data(n)) AND mask (n))!=0000
        push a value of FALSE onto the stack
        execute next instruction
      else
        decrement numCmps by 1
      endif
    endwhile
    push a value of TRUE onto stack
  endif
  execute next instruction.

TestNotEqualMask will return a TRUE result if there is not a match, if there is a match, it will return a FALSE result.

The order of the bytes in the test and mask values is as follows.

For a given data packet of, for example, eight bytes, the bytes are numbered B0, B1, B2 . . . B7. Assume that:

(1) B0 is the least significant byte, and corresponds to the FIRST byte received from the LAN. (Assume also that bit 0 of B0O is the least significant bit of byte 0, and corresponds to the FIRST bit received from the LAN.)

(2) B7 is the most significant byte, and corresponds to the LAST byte of the packet received from the LAN.

The test values are defined as:

test0={T1,T0}, where T0 is the test byte corresponding to B0, and T1 is the test byte corresponding to B1.

test1={T3,T2}, where T2 is the test byte corresponding to B2, and T3 is the test byte corresponding to B3.

testn={Tn+1,Tn}, where Tn is the test byte corresponding to Bn, and Tn+1 is the test byte corresponding to Bn+1.

The mask values are similarly defined as:

mask0={M1,M0}, where M0 is the mask byte corresponding to B0, and M1 is the mask byte corresponding to B1.

mask1={M3,M2}, where M2 is the mask byte corresponding to B2, and M3 is the mask byte corresponding to B3.

maskn={Mn+1,Mn}, where Mn is the mask byte corresponding to Bn, and Mn+1 is the mask byte corresponding to Bn+1.

This ordering is relevant for the TestEqual, TestNotEqual, TestGreaterOrEqual, TestLessThan and TableCompare instructions also.

TestEqual, TestNotEqual

This instruction has the same functionality as the TestEqualMask and TestNotEqualMask instructions, but is preferably optimised for those stations where the mask is always 0xFFFF. It does a string comparison between the input data stream and the test value. If there is a match, a value of TRUE is pushed onto the stack. If there is no match, a value of FALSE is pushed onto the stack. The number of words to compare against is defined in the numCmps field. This instruction can be a variable length. The length field in the instruction indicates the length of the current instruction in bytes. This instruction may contain an odd number of test words, which could result in the instruction ending on a non-longword boundary. The compiler will ensure however, that in this case, an unused field will be inserted at the end of the instruction to make it longword aligned. This ensures that the next instruction starts on a longword boundary. The required length of the packet remaining after the current data pointer, rqPktLeft, is compared against the current length of the packet after the data pointer, pktLeft. PktLeft is calculated in the filter engine as pktLen —(dataAddr-sopAddr); pktLen and sopAddr being passed to the engine. If rqPktLeft is greater than the remaining pktLeft, the test fails and processing continues at the next instruction. Both rqPktLeft and pktLeft are defined as byte lengths:

if pktLeft<rqPktLeft
   push a value of FALSE onto the stack
else
   while numCmps>0
     if (test(n) XOR data(n)) !=0000
       push a value of FALSE onto the stack
       execute next instruction
     else
       decrement numCmps by 1
     endif
   endwhile
   push a value of TRUE onto the stack
endif
execute next instruction.

TestNotEqual will return a TRUE result if there is not a match, if there is a match, it will return a FALSE result.

TestGreaterThan, TestLessOrEqual

This instruction does a word comparison between the input data word and the test word. If the input word is greater than the test word, a value of TRUE is pushed onto the stack. If the input word is less than or equal to the test word, a value of FALSE is pushed onto the stack. A mask field, mask, selects which bits of the data word to compare. A '1' in a mask position means compare, a '0' means don't compare. This instruction can only compare one word, so numCmps must be set to '1' for correct operation. This instruction is a fixed length of twelve bytes, and the length field must be programmed to this value for correct operation. This instruction contains an even number of longwords, thereby ensuring that the next instruction starts on a long word boundary. The required length of the packet remaining after the current data pointer, rqPktLeft, is compared against the current length of the packet after the data pointer, pktLeft. PktLeft is calculated in the filter engine as pktLen —(dataAddrsopAddr), pktLen and sopAddr being passed to the engine. If rqPktLeft is greater than the remaining pktLeft, the test fails and processing continues at the next instruction. Both rqPktLeft and pktLeft are defined as byte lengths.

if pktLeft<rqPktLeft
   push a value of FALSE onto the stack
else
   if (mask(n) AND data(n))>test(n)
     push a value of TRUE onto the stack
   else
     push a value of FALSE onto the stack
   endif
execute next instruction.

TestLessOrEqual will return a TRUE result if the data word is less than or equal to the test word, else it will return a value of FALSE.

TableCmp

Table Compare instruction. Compares a data word against a list of values. If any match, then the program jumps to a location, calculated by adding the jumpValue field to the address of the start of the TableCmp instruction. The jumpValue field is in byte quantities, but hardware only uses bits [15:2] when calculating the new instruction address. (Note that a 'backwards' jump is possible by making the jumpValue a 2's complement number, as hardware sign extends that value to the correct width.) A mask field, mask, selects which bits of the data word to compare. A '1' in a mask position means compare, a '0' means don't compare. The number of words to compare against is defined in the numCmps field. This instruction can be a variable length. The length field in the instruction indicates the length of the current instruction in bytes. As all instructions must be longword aligned, there is a reserved field in the instruction to bring it to a longword boundary. The required length of the packet remaining after the current data pointer, rqPktLeft, is compared against the current length of the packet after the data pointer, pktLeft. PktLeft is calculated in the filter engine as pktLen —(dataAddrsopAddr); pktLen and sopAddr being passed to the engine. If rqPktLeft is greater than the remaining pktLeft, the test fails and processing continues at the next instruction. Both rqPktLeft and pktLeft are defined as byte lengths:

```
if pktLeft<rqPktLeft
    while numCmps>0
        if ((test(n) XOR data) AND mask(n)))=0000
            jump by jumpValue(n) from start of instruction
        else
            decrement numCmps
        endif
    endwhile
endif
execute next instruction.
```

An example of this instruction follows. It compares a data word against three test values, all bits being compared as all bits in the mask field are set. The length of the instruction is therefore six longwords. The instruction starts at location 100 hex. If the first word matches, the program is to jump to 120 hex; if the second matches, then jump to 12C hex; if the third matches, jump to 13C hex. The required packet left length is set to, for example, twenty bytes.

Figure 2:
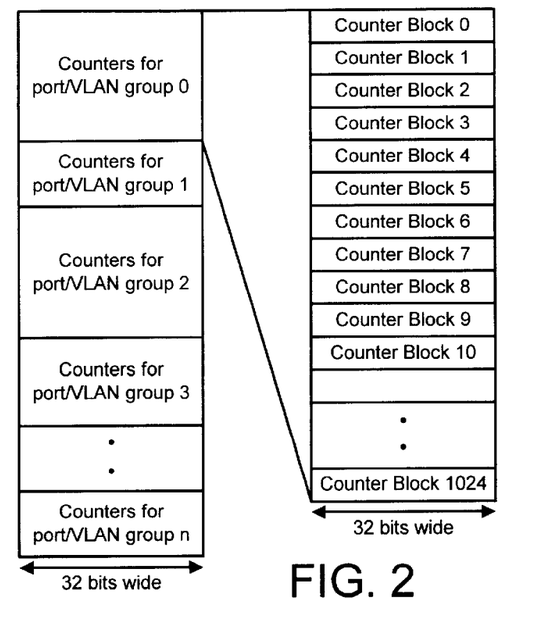
FIGS. 2 and 3 are tables showing the organisation of counters which are used with some of the instructions in the set shown in FIG. 1.

FIG. 2 illustrates the organisation of counters which record events for RMON and can be located in DRAM. These counters are all longword quantities and are located on longword boundaries. The counters can be organised on a per port or per VLAN group basis. Hardware allows up to 1K counters in each port/VLAN group.

Each group can be of variable length, and represents the counters in a particular VLAN or from a particular port. The statsIndex field which is passed to the filter engine defines the address of the first counter of that group. Each group can have up to 1 K counter values. Hardware uses bits [22:2] of the statsIndex field. As the program passes through the packet it uses AddCntrOffset instructions to modify the pointer. For instance, if it decodes the packet as an Ethernet packet, it will add an offset to the address to allow it to point to the list of Ethernet counters. Then, if it further decodes the packet as an IP packet (over Ethernet), it adds an offset to the counter to make it point to the first of the IP over Ethernet counters. If it then decodes it as an IGMP packet, it uses the IncCnt instruction to increment the Ethernet.IP.IGMP counter. The IncCnt instruction passes an offset field such that the address points to the relevant counter within the group.

Figure 3:
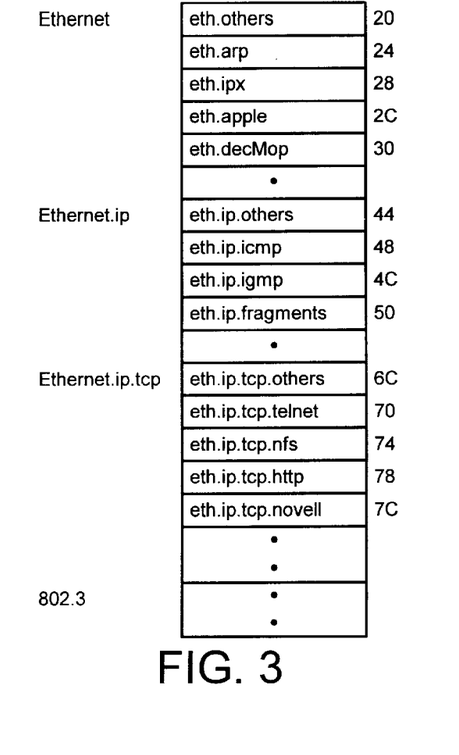

As an example, consider the set of counters for a port0 to be located in DRAM starting at address 20 hex. The counters are located as shown in FIG. 3. Note that the first counter in each group is for any protocol within the group that is not recognised by the program.

The controlling engine is passed the address of the first counter in the port/VLAN group of interest. In this case, statsIndex is 20 hex. Say the packet is telnet running over Ethernet. As the program passes the packet it modifies the pointer. So when it decodes the packet as an IP packet, it adds 24 hex to the address, to the address is now pointing to location 44 hex. When it further decodes it as a TCP packet, it adds an offset of 28 hex to address the group of TCP counters. The incCnt instruction will then pass a value of one longword. Hardware updates the address to one longword from the start of the TCP block, and does a read-modify-write of the location.

Another aspect of the analysis concerns the manner in which data is analysed. Data is compared with test patterns in many applications, such as logic analysers, test algorithms and network analysis. It is customary when testing data words against test words to perform a repeated cycle comprising reading in a test word and storing it in an appropriate storage location, reading in a data word and storing it, performing a comparison of the previously temporarily stored test and data words and, possibly dependent on the result, repeating the cycle or finishing the analysis.

The preferred method according to the invention achieves a more efficient analysis while avoiding errors owing to the misalignment of data words and test words.

The preferred method is illustrated with the aid of FIGS. 4 to 8.

Figure 4:
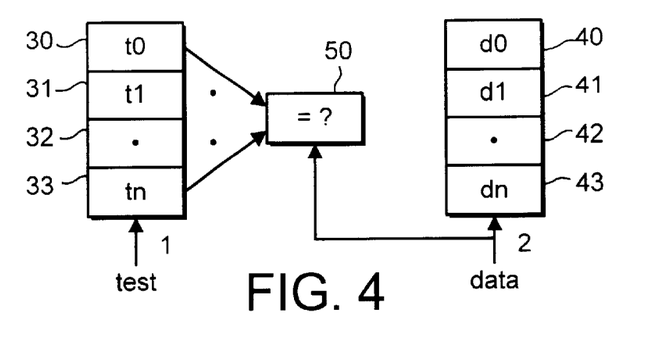
FIGS. 4 to 8 illustrate an unproved method of comparing test patterns and data patterns.

FIG. 4 illustrates the basic operation of the comparison of data with a test pattern. The first stage in the comparison process comprises the burst reading of test words. Thus test words are read in a multiple group, in this example a group of four test words, though there is no restriction on the number. The test word t0, t1 up to tn are read from memory and stored in temporary locations 30, 31 etc. The next phase consists of first reading the data words and storing them in temporary locations 40, 41 etc while simultaneously performing an 'in-line' comparison, i.e. comparing each data word against the corresponding test pattern. Each test pattern is compared against the equivalent data pattern in the comparator 50. The action then depends upon the nature of the test pattern, as indicated elsewhere, where the test generates a result, such as a one-bit result, the result may be 'pushed' onto a stack and the stack is preferably organised as described later with reference to FIG. 14. It will be apparent that the test patterns could be burst read and stored first and the comparisons made as the data patterns are burst read and stored.

One aspect of the method concerns the alignment of misaligned patterns. This is desirable because any test pattern which is burst read can result in the filling of the test store with the end of one pattern and the start of the next pattern, such as one old pattern and three new patterns for a store which is four 'patterns' deep. Although it would be possible to read in a burst of four data patterns for a new test, to compare a lesser number (such as three) and to retain the last pattern, such a process would require counters for both the test store and the data store to remember how many of each store have been used, moreover, such a process prevents the in-line comparison described with reference to FIG. 4.

Figure 5:
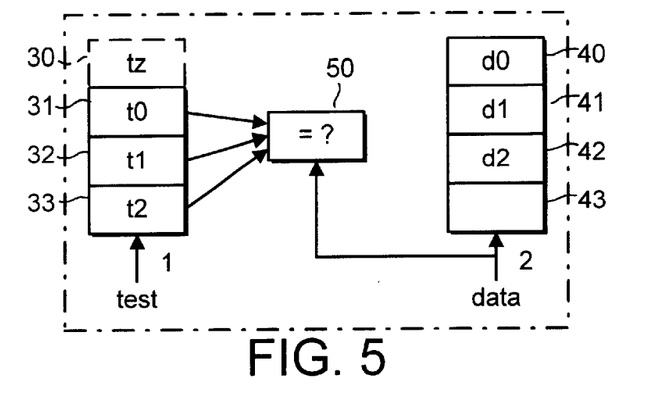

Instead, the method is organised so that the first burst read in a cycle reads in a lesser number of patterns than in the remainder of the process. If for example four test patterns are normally read, the first data burst will read in three patterns only and they will be compared with the last three patterns of the test store. This is shown in FIG. 5, wherein in storage elements 31, 32 and 33 are the test patterns t0, t1 and t2, in data store locations 40 to 42 are the data patterns d0, d1 and d2 whereas the fourth storage location 43 is left empty.

Figure 6:
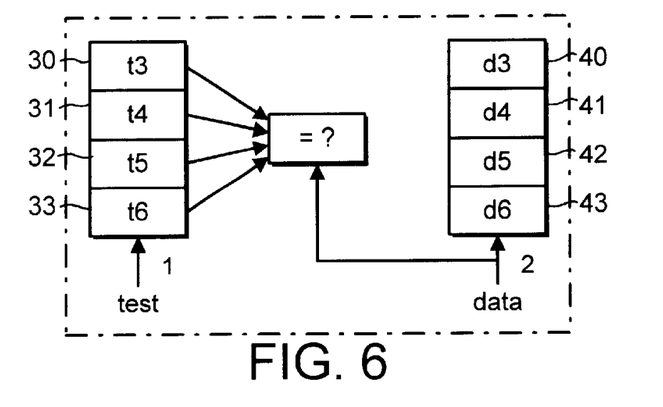

Subsequent burst reads are shown in FIG. 6. Here, the test store locations 30 to 33 now contain test patterns t3 to t6 and the data store locations 40 to 43 will contain data patterns d3 to d6.

It will be further apparent that data may start on misaligned boundaries. It is therefore necessary to ensure that the first data compared and written into a temporary store is d0 to maintain the in-line execution defined in FIG. 4.

Figure 7:
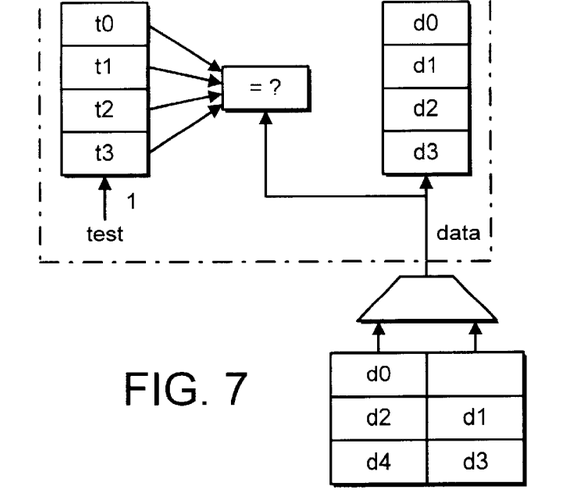

Thus FIG. 7 shows a modified form of FIG. 4 wherein the data pattern progression d0 etc is organised so that alternate data patterns are presented to respective inputs of a multiplexer. The alternation of operation of the multiplexer may be controller by a pointer for the data pattern d0.

Figure 8:
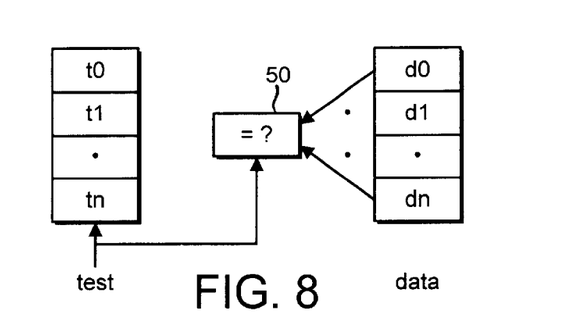

A further stage in the process concerns the reuse of stored data. The process described with reference to FIGS. 4 to 7 leaves data patterns in temporary storage locations. Where, as is usual, a multiplicity of tests must be performed on a particular data stream or subset of a stream, the patterns for the subsequent tests to be made may be read into storage locations while simultaneously compared one-on-one with the data patterns in the storage locations. Thus the 'in-line' method may be repeatedly used as shown in FIG. 8.

Figure 9:
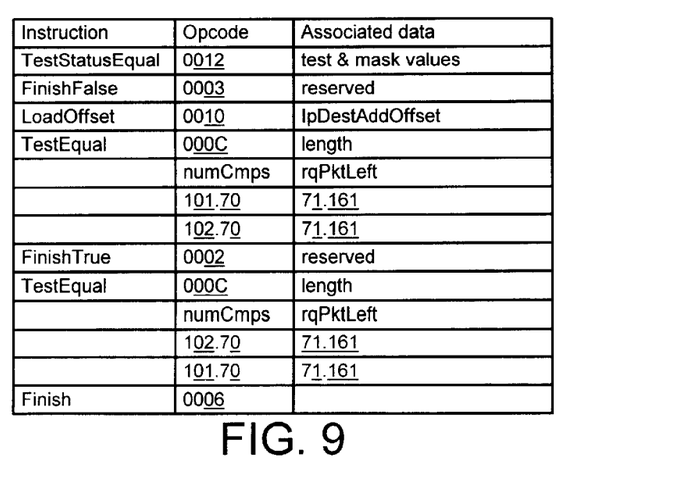

FIG. 9 illustrates a set of instructions (selected from the set defined in FIG. 1) for searching packets for a specific IP Address pair, in either direction and particularly for packets from 161.71.70.101 to 161.71.70.102 or from 161.71.70.102 to 161.71.70.101. The instructions in FIG. 9 are stored in external memory. For the program shown in FIG. 9 the controlling engine will execute the operations shown in FIG. 10. It is assumed in this example that a four-longword burst read from DRAM requires ten system clock cycles and there are two four-longword burst accesses to DRAM before the filter obtains the required access to DRAM. It may be noted that stages 3 and 6 to 10 of the operation particularly show the features discussed in relation to FIGS. 4 to 8.

Figure 11:
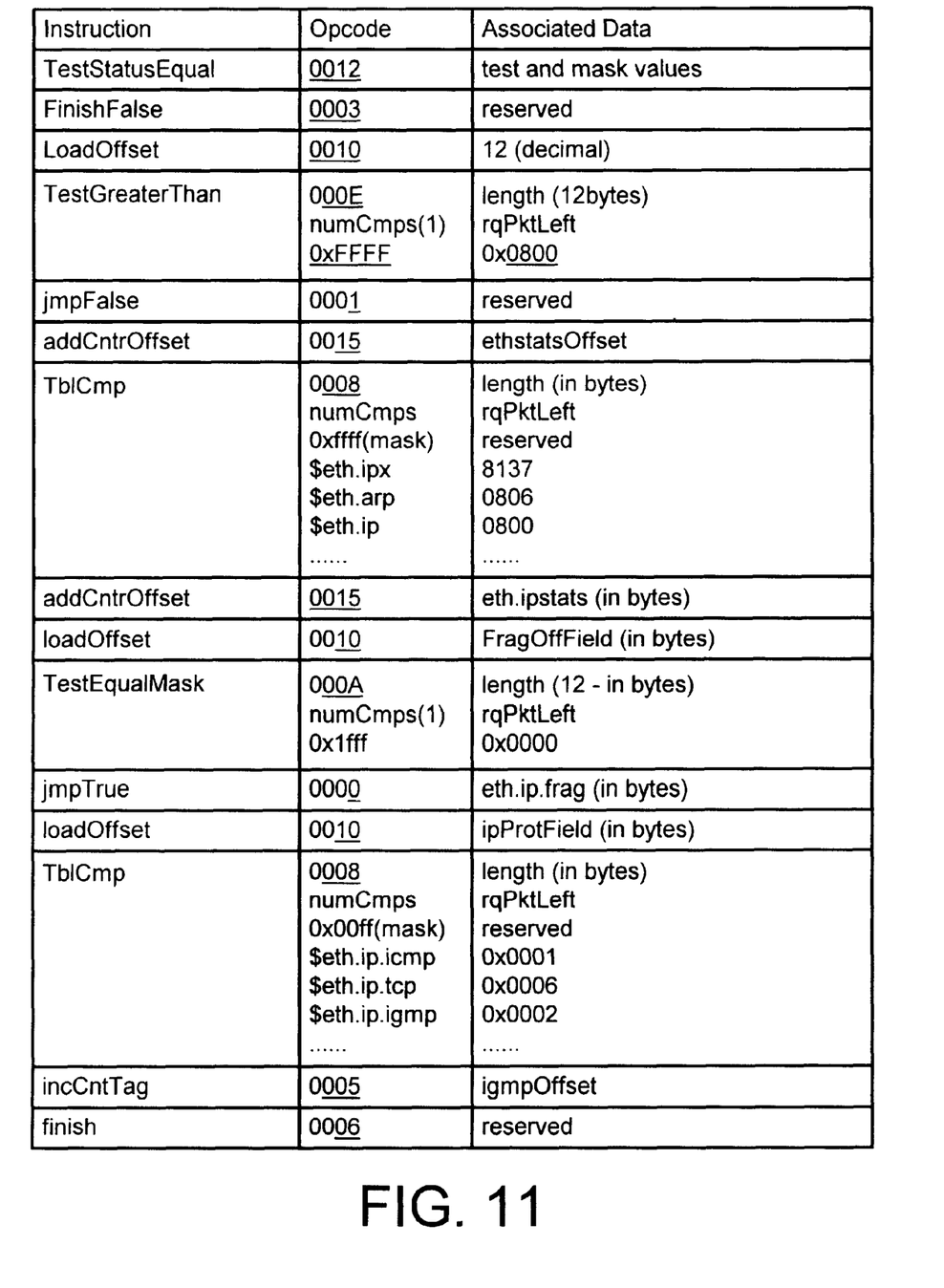

A second example of a selected set of instructions is illustrated in FIGS. 11 and 12. This example is a typical protocol distribution program. This particular example finds that the protocol running is IGMP over Ethernet, and therefore has to parse deep into the packet to determine this protocol. Other protocols, such as IPX, would not need as long a program as this example, and so would be decoded faster. A protocol such as telnet over Ethernet would require a longer program to pass further into the IP header.

Another aspect of the system described herein concerns a more efficient manner of operation of a stack, or last in, first out, storage buffer. Many of the tests described hereinbefore require a result (which may be a single digit but could be any reasonable width) to be pushed onto a stack. Stacks of this character enable processing of results or data words in the stack by a process which requires each entry to be removed or 'popped' from the stack, one at a time. Thus, if the stack contains a multiplicity of data words representing, for example, intermediate results of analysis, the obtaining of a final result by the operation of, typically, combinational (combinatorial) logic or simple arithmetic operations, requires a multi-stage process wherein the top entries are 'popped' from the stack and a single entry, representing an intermediate result, is pushed back onto the stack.

Figure 13:
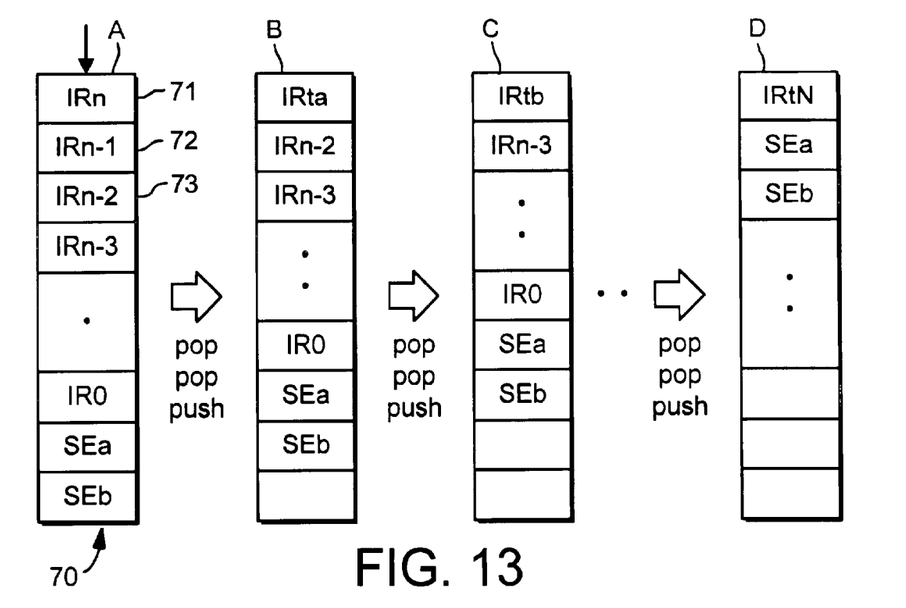
FIG. 13 illustrates a known technique for operating a data stack.

This is shown in FIG. 13A, wherein numeral 70 represents a stack having storage locations 71, 72, 73 and so on. In the stack are stored results of which the most recent IRn is at the top of the stack and the next most recent results in turn, namely IRn−1 and so on are stored in progressively deeper locations in the stack. The Figure shows two data words or elements SEa and SEb which were pushed onto the stack before any of the intermediate results.

FIG. 13B illustrates the obtaining of an intermediate result IRta which is obtained by popping the top two elements from the stack shown in FIG. 13C, performing an arithmetical combinatorial logic operation on them and reinserting the result, namely IRta, back on the top of the stack. A computational result involving all the elements IRn to IR0 may be obtained by repeating the operation shown between FIGS. 13A and 13B. Thus in FIG. 1C, the second intermediate result IRtb is obtained by-popping the top two elements from the stack shown in FIG. 13B and pushing the result, IRtb, back to the top of the stack.

Figure 14:
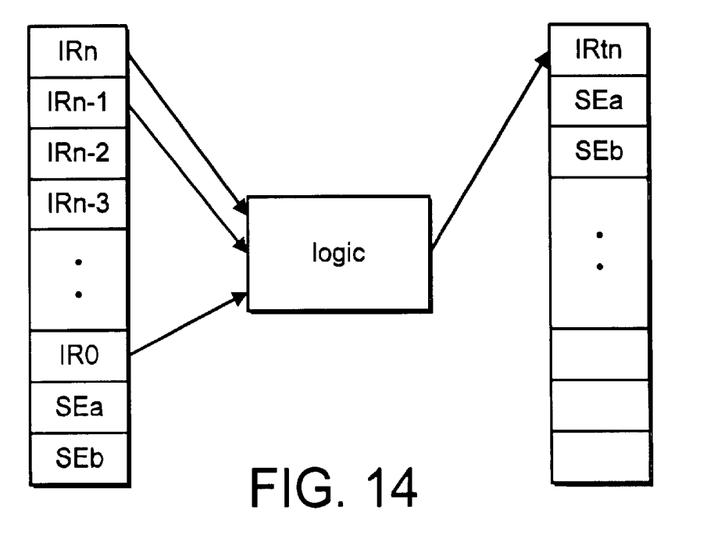
FIG. 14 illustrates a novel technique for operating a data stack.

FIG. 14 illustrates an improvement wherein the top m elements, where m is selectable, may be simultaneously popped from the stack, subjected to a combinational operation to yield a single result, Irtn, which is pushed back onto the stack. This scheme requires only one cycle to pop a variable number of intermediate results from the stack to generate a final result and to push the final result back onto the stack.

Figure 15:
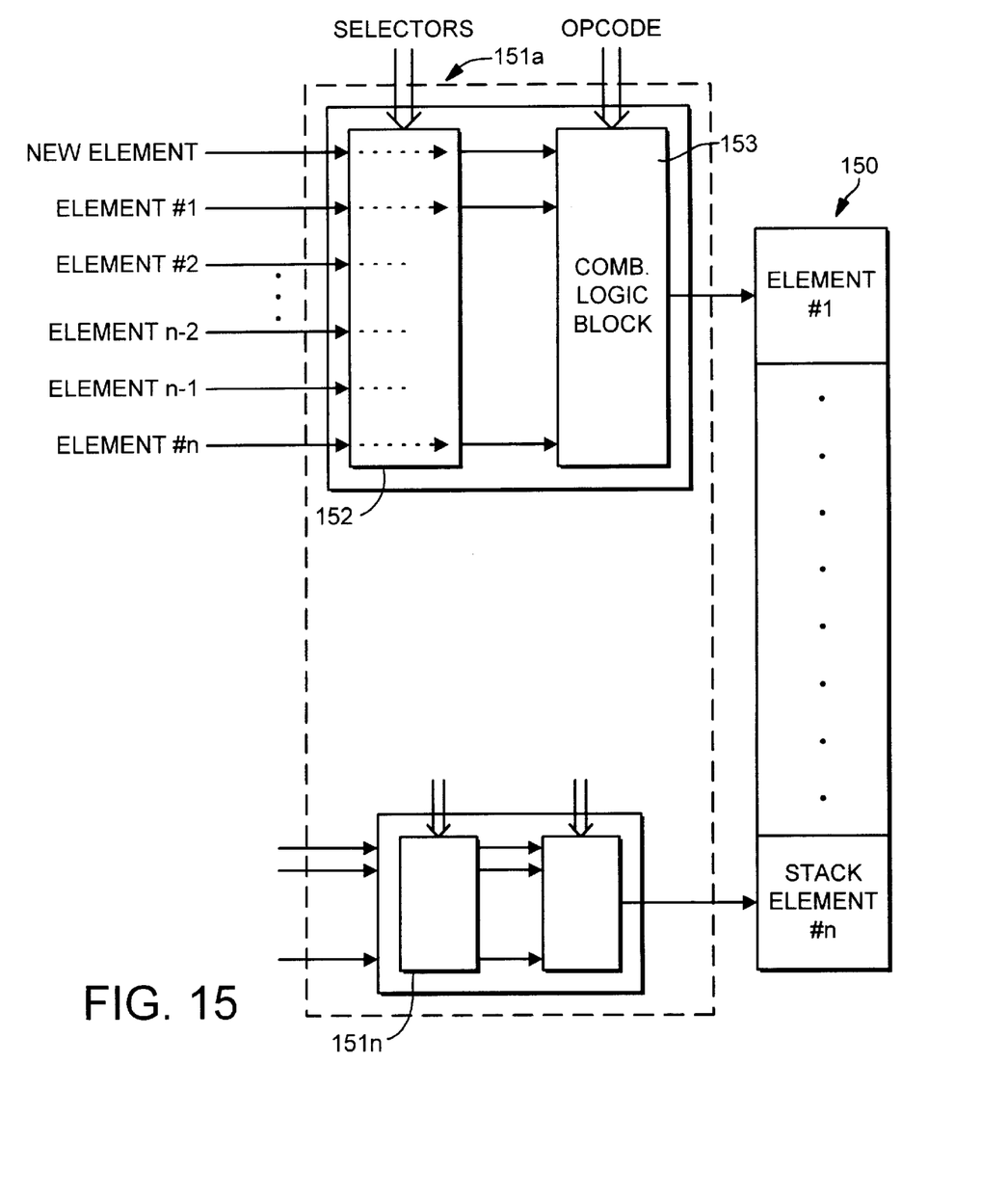
FIG. 15 is a schematic diagram of a novel stack and its associated controls.

FIG. 15 is a schematic diagram of a stack incorporating the improvement. The stack 150 may contain n elements l to n. Each location in the stack is controlled by a respective one of the logic circuits 151*a* to 151*n* which receives as an input the n elements of the stack and a new element. These elements are input to selectors 152, each selector can select any combination of the stack elements and provide the selected elements to a combinational logic block 153 which a selected operation (AND, OR etc) in accordance with an opcode applied to the block. Thus the combinational logic block can perform a selection of manipulations on selected elements.

We claim:

1. A method of processing data contained in data packets, said method comprising:
    (a) providing a program of selected microcode instructions of which at least one prescribes a test on a data pattern in a data packet;
    (b) subjecting a multiplicity of said data packets to said program including at least one of said test;
    (c) pushing a result of each said test onto a last-in first-out multiple-level temporary storage stack whereby each result is stored at a different level in the stack;
    (d) performing a combinational logic operation on a selected multiplicity of the results from the top of said stack;
    (e) removing said selected multiplicity of said results from the top of said stack; and
    (f) pushing the resultant of said logic operation onto said stack.

2. A method as claimed in claim 1,
    wherein said step of pushing a result of each said test onto a last-in first-out multiple-level temporary storage stack whereby each result is stored at a different level in the stack is performed in the same operation as said step of removing said selected multiplicity of said results from the top of said stack.

* * * * *

UNITED STATES PATENT AND TRADEMARK OFFICE
CERTIFICATE OF CORRECTION

PATENT NO. : 6,550,025 B1  
DATED : April 15, 2003  
INVENTOR(S) : O'Connell et al.

It is certified that error appears in the above-identified patent and that said Letters Patent is hereby corrected as shown below:

<u>Title page,</u>  
Item [75], Inventors, should read:  
-- [75] Inventors: Anne G. O'Connell, Dublin (IE);  
                Mark A. Hughes, Dublin (IE);  
                Peter J. Wilson, Welwyn Garden City (UK) --

Signed and Sealed this

Thirtieth Day of September, 2003

JAMES E. ROGAN  
*Director of the United States Patent and Trademark Office*